US00RE39900E

(19) United States
(12) Reissued Patent
Hein et al.

(10) Patent Number: US RE39,900 E
(45) Date of Reissued Patent: Oct. 30, 2007

(54) LIGHT FIXTURE HAVING A PLURALITY OF LIGHT REFLECTING FINS

(76) Inventors: William A. Hein, 607 6 th St., Manhattan Beach, CA (US) 90266; Henry M. Avila, 5545 East Ave., T-8, Palmdale, CA (US) 93552; Peter C. Sara, 3525 Buena Creek Rd., Vista, CA (US) 92084

(21) Appl. No.: 10/325,072

(22) Filed: Dec. 20, 2002

Related U.S. Patent Documents

Reissue of:
(64) Patent No.: 6,168,295
Issued: Jan. 2, 2001
Appl. No.: 09/251,306
Filed: Feb. 17, 1999

U.S. Applications:

(63) Continuation-in-part of application No. 29/094,329, filed on Sep. 30, 1998, now Pat. No. Des. 417,301.

(51) Int. Cl.
*F21V 13/10* (2006.01)

(52) U.S. Cl. ..... 362/308; 362/147; 362/145; 362/257; 362/292; 362/297; 362/296

(58) Field of Classification Search ..... 362/308, 362/147, 153.1, 292, 297, 374, 145, 257, 362/296, 307, 310, 362, 375
See application file for complete search history.

(56) References Cited

U.S. PATENT DOCUMENTS 188,700 A * 3/1877 Von Otter ..... 116/18
270,339 A 1/1883 Ritchie
1,100,484 A * 6/1914 Inman ..... 362/283
1,350,212 A * 8/1920 Davis ..... 362/292
1,421,506 A * 7/1922 Limpert ..... 362/291
1,421,838 A * 7/1922 Schaeffer ..... 362/283
1,434,302 A * 10/1922 Marcotte ..... 362/279
1,546,281 A 7/1925 Brown (Continued)

OTHER PUBLICATIONS

Holophane Mongoose ™ Architectural Luminaire brochure, dated Dec. 1999

Hydrel 7200 Series Architectural Lightning System brochure, dated Mar. 1999. See specifically pp. 4. (Horizontal Flood) and 6 (Downlight, Forward Wide and Downlight, Symmetrical). For this same series of fixtures, Hydrel 7100/7200 Series, see also the drawings that show the Hydrel 7100 Series, developed in approximately 1992, and the Hydrel 7200 Series, developed in approximately 1994.

Kim Lightting, AFL $^2$ Archetectural Floodlights brochure, dated Jul. 1991.

EMCO Lightning brochure, Infinette Luminaire, dated 1990.

Hydrel Hypack 4000 brochure, dated May 1993.

Moldcast, The MD ™ Series brochure, dated 1983.

Wide–Lite's Spectra® Cutoff Family brochure, dated Jun. 1979.

Holophane Mongoose™ Assembly, dated May 21, 1999.

*Primary Examiner*—Sandra O'Shea
*Assistant Examiner*—Anabel Ton
(74) *Attorney, Agent, or Firm*—Jerry R. Potts

(57) ABSTRACT

A light fixture having a base for housing a light producing source and a flat plate disposed within the base. The plate has a well formed in it, the well having light reflecting walls. A lamp socket is located in a light reflecting bottom wall of the well. A plurality of light reflecting elements is attached to the plate and a pair of light reflecting assemblies, one on either side of the well, is fixed to the plate. Each light reflecting assembly includes a plurality of light reflecting fins affixed to the plate and projecting at an angle away from the plate. A frame having a convex lens affixed thereto is hingedly attached to the base. A light shield is fixed to the frame for reducing dispersion of unwanted light.

59 Claims, 3 Drawing Sheets

U.S. PATENT DOCUMENTS 1,591,754 A * 7/1926 Gates ..... 362/283
1,654,974 A * 1/1928 Johnson ..... 362/292
2,035,215 A 3/1936 Bean
2,065,164 A * 12/1936 Wetzel ..... 362/279
2,111,085 A 3/1938 Arras
2,369,894 A 2/1945 Hallman et al.
3,265,883 A 8/1966 Tolbert
3,456,101 A * 7/1969 Rentschler et al. ..... 362/4
4,007,365 A 2/1977 Stempfle et al.
4,041,306 A 8/1977 Compton et al.
4,293,900 A 10/1981 Dziubaty
4,451,875 A 5/1984 Odle et al.
4,453,203 A 6/1984 Pate
4,488,205 A 12/1984 Quiogue
4,575,783 A 3/1986 Hammond
4,580,200 A * 4/1986 Hess et al. ..... 362/223
4,701,832 A 10/1987 Lasker
4,954,935 A 9/1990 Hammond et al.
5,432,683 A * 7/1995 Brown ..... 362/16
5,593,225 A 1/1997 Safyan
5,921,662 A * 7/1999 Bruckner et al. ..... 362/292
5,938,317 A * 8/1999 Thornton ..... 362/290
6,152,579 A 11/2000 Reed et al.
6,168,295 B1 * 1/2001 Hein et al. ..... 362/308

* cited by examiner

LIGHT FIXTURE HAVING A PLURALITY OF LIGHT REFLECTING FINS

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation in part patent application of U.S. application Ser. No. 29/094,329, titled "Light Fixture", filed Sep. 30, 1998 now U.S. Pat. No. D,417,301.

FIELD OF THE INVENTION

The present invention relates generally to light fixtures and, more particularly, to light fixtures suitable for illuminating flat surfaces.

BACKGROUND OF THE INVENTION

Surface illuminating devices are well known. For example, light fixtures are used in museums to illustrate paintings and on highways to light up directional signs. In another common use, conventional light fixtures are utilized to illuminate outdoor advertising, found along highways and thoroughfares.

The well-known term "billboard" is often used for poster panels and bulletins. A typical bulletin is utilized to advertise printed or hand painted messages and is usually found in high density traffic locations. The bulletin typically has an area of 672 square feet, having a height of about 14 feet and a width of about 48 feet. Poster panels are smaller, with an area of about 300 square feet, a height of about 12 feet and a width of about 25 feet. A poster panel is typically about 6 feet high and approximately 12 feet wide, having an area of about 72 square feet. While this specification sets forth the present invention as it relates to bulletins, it will be recognized that the present invention has application to a variety of cases wherein it is desirable to illuminate a large flat surface. For convenience, the "billboard" will be used herein in reference to such surfaces.

In a many cases, billboards display graphic advertisements or public service messages and the boards are oriented so as to be seen by motorists and pedestrians passing them during travel. Typically, a billboard having a length of 48 feet is illuminated from below by four light fixtures equidistantly spaced along a bottom surface of the board and separated from the board by about 4 to six feet. An important desirable characteristic of billboard light fixtures is that, when spaced along the lower edge of a billboard, they provide uniform lighting to the board so that no dark spots or shadows occur across the surface thereof. This characteristic is generally not found in conventional billboard light fixtures.

It is not uncommon in a billboard lighting system, utilizing four light fixtures, for the billboard to have four islands of bright illumination with shadowed areas at the periphery of the islands and between the islands of light. The result is an illuminated billboard that is not esthetically attractive and which, in some respects, fails to convey the advertiser's message because of uneven illumination or shadows on the board.

Thus, there is a need for a light fixture, adapted for use in illuminating flat surfaces such as billboards, that can illuminate the surface in a generally uniform manner while substantially reducing shadowed areas.

In view of the environment in which the device is utilized, such a light fixture should have some weather resistant capabilities since it will be exposed to a variety of changing and, sometimes severe, weather conditions. It should be resistant to invasion by insects and other pests and it should be easily maintained and capable of being opened quickly and easily for bulb replacement and maintenance. In addition, the light fixture should have good aerodynamic characteristics so as to withstand high winds without damage.

Further, the fixture should not contribute to "light pollution" by scattering light away from the object being illuminated. Still further, the light fixture should have a low profile so that it would not draw the eye of the observer to itself but, instead, would induce the observer to look at the surface being illuminated.

In some cases, conventional light fixtures fail to satisfy the aforesaid criteria.

In view of the foregoing, there is a need for a light fixture having a low profile, readily accessible for repair and bulb replacement and aerodynamically shaped to help reduce wind damage. Desirably, such a light fixture could provide a broad spectrum of illumination over a flat surface so that, when used in combination with similar fixtures, a large billboard surface could be illuminated in a relatively uniform manner while substantially reducing light pollution.

Ideally, such a light fixture would be low in cost to manufacture, being constructed of readily available materials.

SUMMARY OF THE INVENTION

In accordance with the present invention, there is provided a light fixture having a base for housing a light producing source and a flat plate disposed within the base. The plate has a well formed in it, the well having light reflecting walls. A lamp socket is located in a light reflecting bottom wall of the well. A plurality of light reflecting elements is attached to the plate and a pair of light reflecting assemblies, one on either side of the well, is fixed to the plate. Each light reflecting assembly includes a plurality of light reflecting fins affixed to the plate and projecting at an angle away from the plate. A frame having a convex lens affixed thereto is hingedly attached to the base. A light shield is fixed to the frame for reducing dispersion of unwanted light.

The present invention affords several advantages. For example, the light reflecting elements, walls and fins cooperate to distribute light over a flat surface uniformly, in an efficient and effective manner. When a billboard is illuminated by the present invention, shadows and dark spots are substantially reduced and an aesthetically pleasing result is obtained.

The light fixture of the present invention is constructed of readily obtainable materials and it has a rugged construction for use in varying weather conditions. The provision of a light shield helps to reduce unwanted light pollution and, as a result, the fixture is usable in an urban environment. In addition, the light fixture of the present invention is easy to install, mechanically simple, economical and easy to maintain and service.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
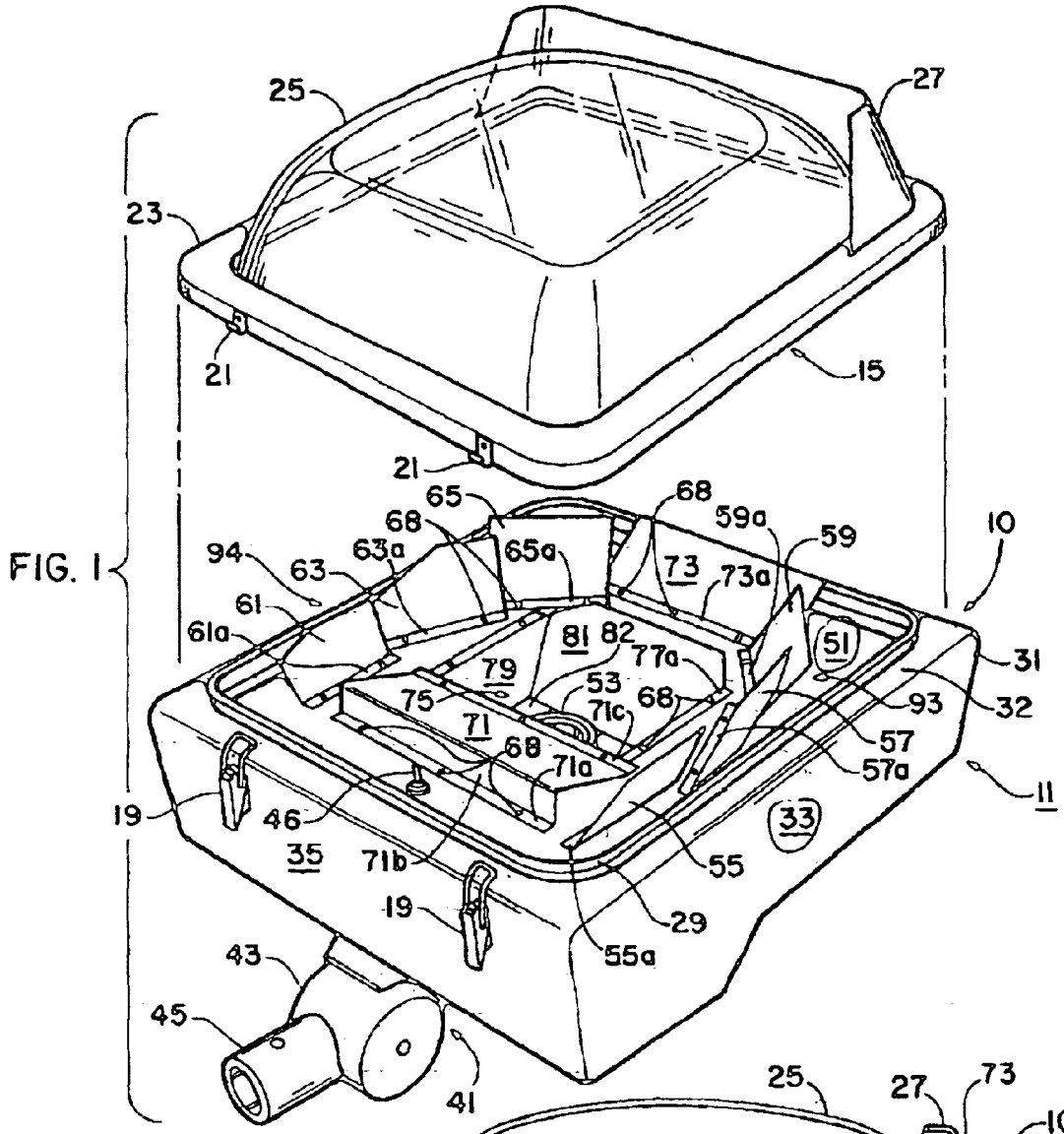
FIG. 1 is a perspective view of the light fixture of the present invention showing the housing and lens assembly in separated relationship.
Figure 3:
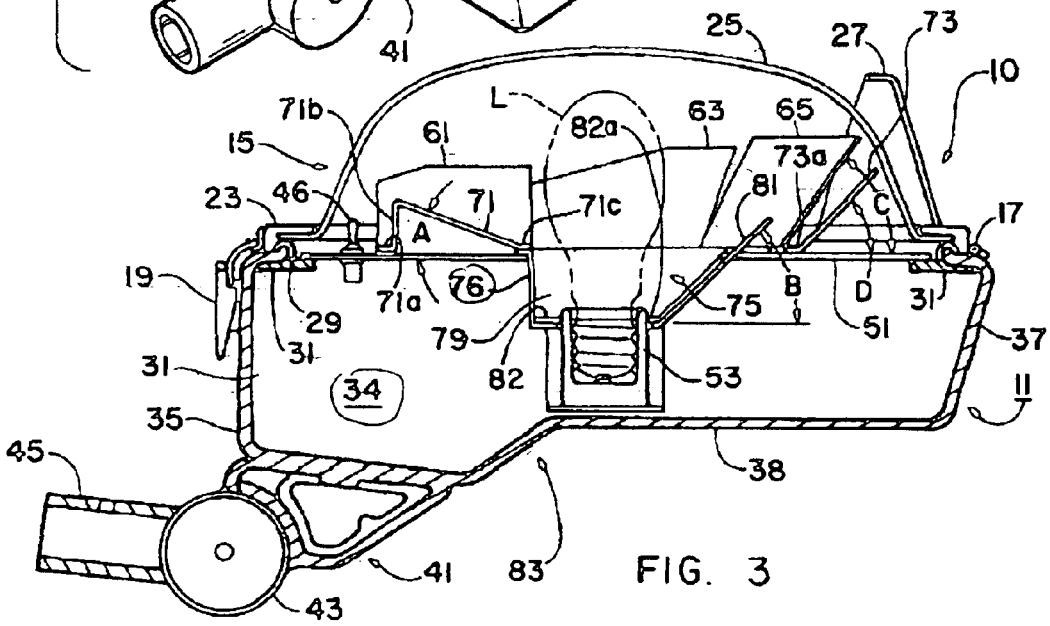
FIG. 3 is a sectional view taken along the line 3—3 of FIG. 2.

Referring now to the drawings, and more particularly to FIGS. 1–4 thereof, there is shown the light fixture 10 of the present invention. The fixture 10 includes a generally rectangular base 11, having a cover 15 connected by a hinge 17. The base 11 described and depicted herein is generally rectangular in plan view and, for convenience, it may be regarded as having front, back, left and right sides. It will be recognized that light fixtures having bases with other shapes, round or oval for example, are within the contemplation and scope of the present invention.

The cover 15 is fixed to the base 11 by means of latches 19, which engage hooks 21 on the cover 15. The cover 15 includes a frame 23 that surrounds and holds a conventional convex lens 25. A light shield 27, affixed to the frame 23, helps to prevent unwanted light scattering. The shield extends across a rear portion of the frame 23, and wraps partially along the sides of the frame 23. The light shield 27 has a height approximately equal to the height of the lens 25.

The base 11 includes a right sidewall 33, a left sidewall 34, a front wall 25 and a rear wall 37. In the presently preferred embodiment, the walls are constructed of stamped aluminum. A knuckle assembly 41 extends from a bottom wall 38 and includes a joint 43 and a pipe 45. The assembly 41 permits water tight and weatherproof access to the interior of the fixture 10 for provision of electrical lines. The joint 43 enables adjustment of the angle at which the light fixture 10 is oriented toward a billboard to be illuminated.

The base 11 includes a silicon gasket 29 which serves to provide a weather tight seal when the cover 15 is closed and clamped against the base 11. A switch 46, located near the front of the light fixture 10, within the gasket 29, permits power to the fixture 10 to be turned off and on during routine maintenance and lamp replacement.

The base 11 includes a generally rectangular flat sheet aluminum plate 51. Brackets, such as the brackets 31, support the plate 51 which is fixed thereto in a conventional manner. A well 75 is formed in the plate 51. Defining the well 75 are a light reflecting front wall 76, a light reflecting rear wall 81, light reflecting left and right sidewalls 79 and 77, respectively, and a bottom wall 82. An opening 82a is formed in the bottom wall 82 for receipt of a lamp socket 53 that, in turn receives a lamp L. Each one of the light reflecting walls defining the well 75 is of sheet aluminum construction. The walls 76, 77 and 79 are each generally trapezoidal in shape each having a foot portion 76a, 77a and 79a respectively, bent at about a right angle to the wall surface. The foot portions 76a, 77a and 79a are fixed to the plate 51, in a conventional manner, by fastening means such as rivets 68. It will be noted that the rear wall 81 extends above the surface of the plate 51 and describes an angle B with the plate 51 of about 45°. The rear wall 81 is of sheet aluminum construction and generally trapezoidal in shape. The top edge of the wall 81 is truncated, having portions on the left and right sides removed. The light reflecting surfaces of the light reflecting walls 76, 77, 79, 81 and 82 each have a polished mirror-like finish.

A light reflecting element 71, of sheet aluminum construction, is disposed forward of the well 75. The element 71 includes a short light reflecting vertical wall 71b that is fixed at a flange 71a by rivets 68 to the plate 51. With respect to the plate 51, the light reflecting element 71 slopes downwardly, toward the well 75, at an angle A of approximately 45°, to a flange 71c which is affixed by rivets 68 to the upper surface of the plate 51.

In a similar manner, at the rearward portion of the base 11, there is a light reflecting plate 73 that is also of sheet aluminum construction. The reflecting plate is fixed to the plate 51, at a flange 73b, by rivets 68. With respect to the plate 51, the reflecting plate 73 slopes away from the well 75 at an angle D of about 45°. The light reflecting surfaces of the light reflecting element 71 and the light reflecting plate 73 each have a polished mirror-like finish.

Figure 2:
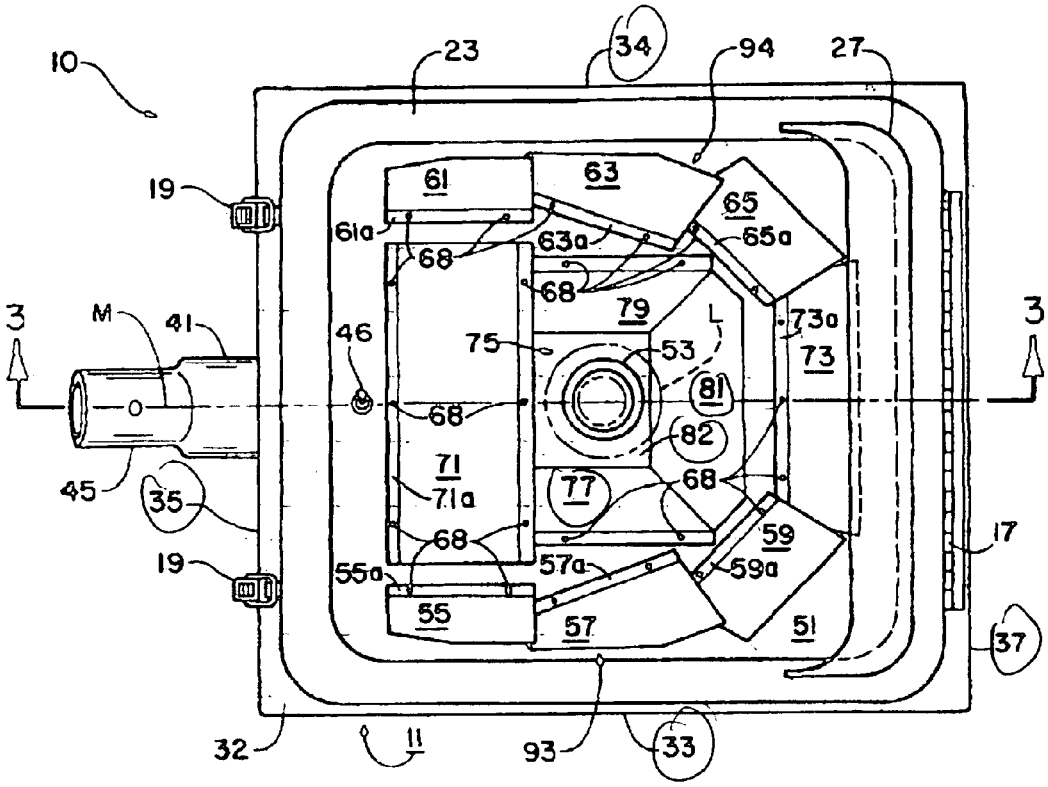
FIG. 2 is a top plan view of the light fixture.
Figure 4:
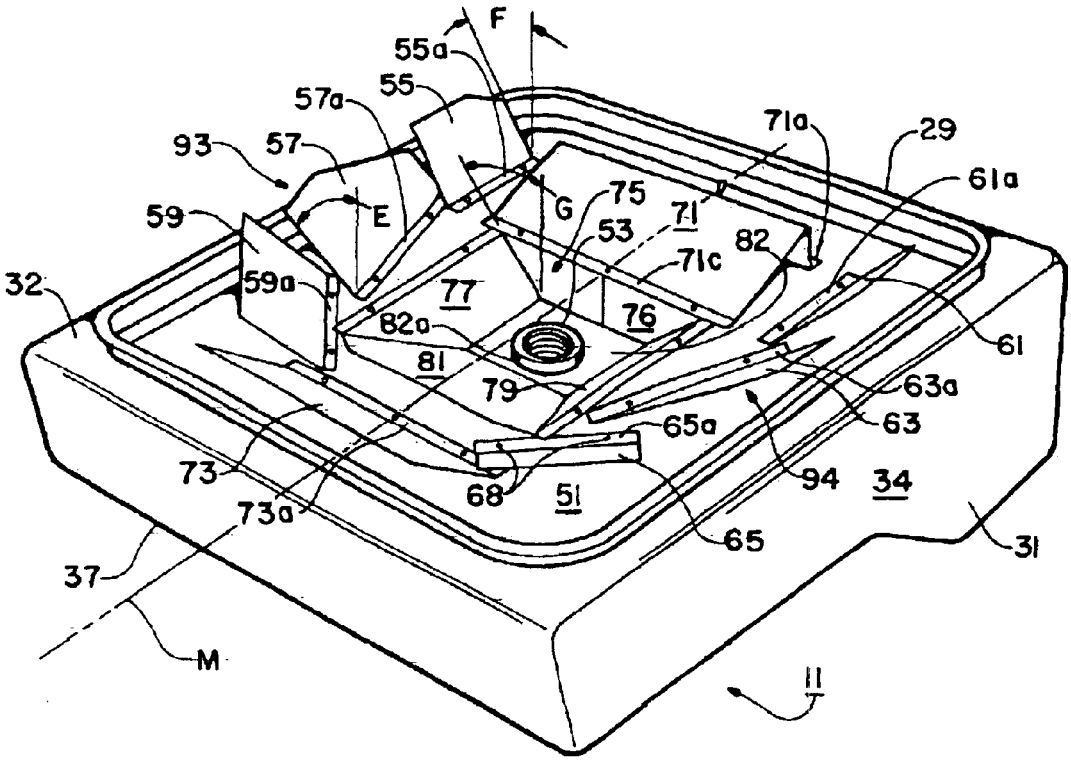
FIG. 4 is a perspective view of the base of the light fixture showing some of the components thereof; and, FIG. 5 is a schematic depiction of the right one half of a billboard showing photometric readings taken at various places on a billboard illuminated by four light fixtures of the present invention.

As mentioned, while the base 11 is generally rectangular in shape, other shaped bases are within the scope of the present invention. Although the shape of the base might change from one embodiment to another, the light fixture 10 may be regarded as being generally symmetrical about a line M which, as shown in FIGS. 2 and 4, divides, or bisects, the light fixture 10 into symmetrical halves. As the term is used herein, "bisects" means "to divide into two generally equal halves".

Lateral light reflecting assemblies 93 and 94 will now be considered, with reference to FIGS. 1–4. The lateral assemblies are disposed laterally of the bisecting line M with the assembly 93 on the right side and the assembly 94 on the left. Each one of the assemblies 93 and 94 includes three trapezoidal light reflecting fins. Each one of these fins is of sheet aluminum construction and each is fixed to the plate 51 by fastening means such as the rivets 68. It will be understood that the light reflecting surfaces of each one of the trapezoidal fins have a polished mirror-like finish.

The light reflecting fins comprising the assembly 93 are the fins 55, 57 and 59. Each fin is affixed by rivets 68 to the plate 51 at flanges 55a, 57a and 59a, respectively. Similarly arrayed on the left side of the base 11 and comprising the assembly 94 are the fins 61, 63 and 65 having respectively flanges 61a, 63a and 65a fixed by rivets 68 to the plate 51.

Each one of the light reflecting fins 55, 57, 59, 61, 63 and 65 is canted slightly laterally away from the vertical with respect to the plate 51. In this regard, the fins 59 and 65 each describe an angle C (FIG. 3) of between about 50° and 60° with a preferred angle of about 55°. The fins 57 and 63, with respect to a line perpendicular to the plate 51, each describe an angle E (FIG. 4) of between about 55° and 65° with a preferred angle of about 60°. The fins 55 and 61, with respect to a line perpendicular to the plate 51, each describe an angle F (FIG. 4) of between about 65° and 75° with a preferred angle of about 70°.

Each one of the fins in the lateral assemblies 93 and 94 is trapezoidal in shape and each one of a given assembly differs from the other two fins of the assembly. By way of example, the assembly 93 will now be discussed. It will be understood that the descriptions of the fins 55, 57 and 59 apply equally to their counterparts, the fins 61, 63 and 65, respectively, comprising the assembly 94.

The fin 55 is generally rectangular in shape and constructed of aluminum. It is attached to the reflector plate 51 at a flange 55a by means of rivets 68. The fin 55 and the flange 55a are aligned generally parallel to the right sidewall 33 of the base 11. It will be understood that if the base had a round or oval construction, the fin 55 and the flange 55a would be aligned generally parallel to a line bisecting the elements 71 and 73. The top surface of the fin 55 is not squared but has a small wedged shaped portion removed at the forward portion of the fin.

The fin 57 is located between the fin 55 and the fin 59. The fin 57 includes a flange 57a fixed to the plate 51 by rivets 68. The fin 57 is trapezoidal in shape and the fin and the flange 57a are disposed at an angle of about 30° angle to the right sidewall 33 or at a similar angle to a line bisecting the elements 71 and 73. The fin 57 is also of aluminum construction, having a pair of parallel sides and a truncated top. The fin 57 extends laterally with respect to the fin 55, overlapping the fin 55.

The fin 59 is fixed, at a flange 59a, to the plate 51 by rivets 68. The fin 59 is disposed so as to describe the hypotenuse of a right triangle formed by the right sidewall 33 and the rear wall 37. Thus, the fin 59 and the flange 59a are disposed at an approximate 45° angle to the right sidewall 33 or at a similar angle to a line bisecting the elements 71 and 73. The fin 59 is also of aluminum construction. It has a generally rectangular shape having a pair of sidewalls 59a and 59b and a top wall 59c. The fin 59 extends laterally with respect to the fin 57, overlapping the fin 57.

In a presently preferred embodiment of the present invention, the bottom wall 38 slopes downwardly to help form a space 83, defined by the sidewalls 33 and 34, the bottom wall 38 and the front wall 35. The space 83 enables convenient storage of lamp wiring and ballast (neither shown), without substantially increasing the size of the light fixture 10.

The light fixture 10 is suitable for use with a variety of conventional lamps. In a presently preferred embodiment, the lamp L is a metal halide 400 W lamp manufactured by Venture Lighting, Solon, Ohio.

Figure 5:
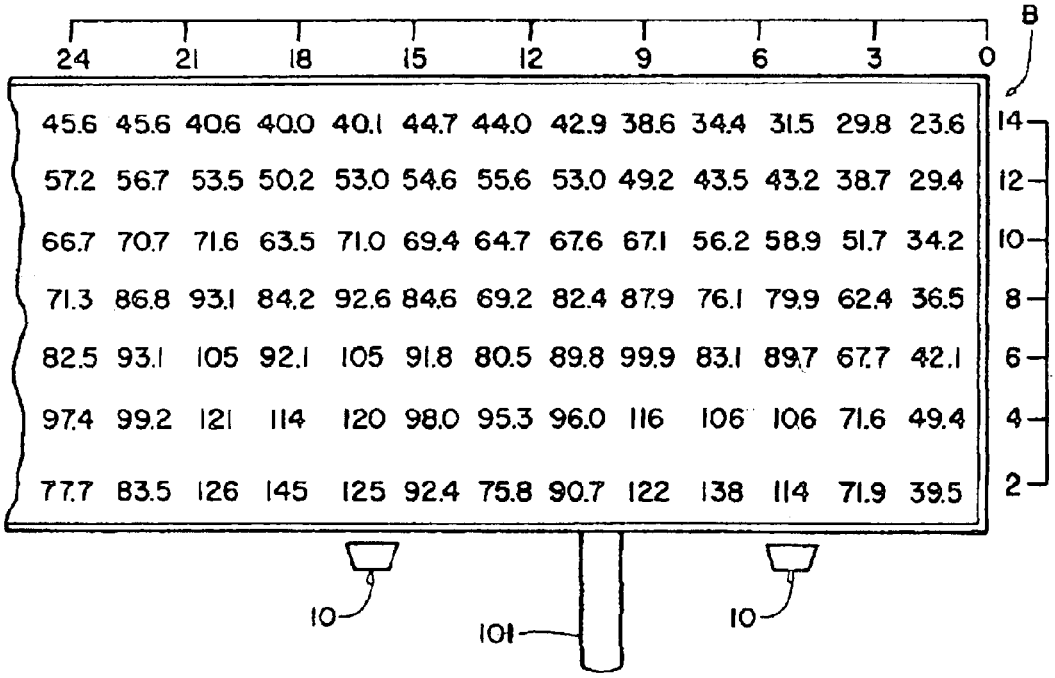

In operation, the light fixture 10, by virtue of the plurality of highly polished fins and reflective surfaces, produces a uniform light over a large flat surface. For example, by reference to FIG. 5, there is shown schematically the right one half of a typical billboard B erected on a leg 101 and illuminated by two light fixtures 10. Distances in feet from the bottom edge of the billboard B are shown along the vertical to the right of the billboard while distances in feet from the right edge of the billboard are shown in a horizontal display above the board. Typically, the billboard B has a height of about 14 feet and a width of about 48 feet. In tests performed on a billboard having such dimensions, four light fixtures 10 were disposed equidistantly along the lower edge of the billboard. Photometric values were measured at various places on the billboard B. The values obtained, in foot-candles, are shown in FIG. 5. Identical, symmetrical values were obtained on the left side (not shown) of the billboard B. It will be seen that light fell on all portions of the billboard B with general uniformity. The result obtained shows that dark spots and areas of darkness between light segments have been substantially eliminated.

The present invention may be embodied in other specific forms without departing from its spirit or essential characteristics. The described embodiments are to be considered in all respects only as illustrative and not restrictive. The scope of the invention is, therefore, determined by the appended claims rather than by the foregoing description. All changes, which come within the meaning and range of equivalency of the claims, are to be embraced within their scope.

What is claimed is:

1. A light fixture for illuminating a surface, comprising:
a base for housing a light producing source;
a convex lens covering at least a portion of said base;
a *rectangular shaped* plate disposed within said base; and
a plurality of *different size and shape* light reflecting fins [affixed to said plate and] projecting from said plate in a direction away from said plate.

2. The light fixture according to claim 1, wherein said fixture includes a frame moveably connected to said base, said lens being fixed to said frame.

3. The light fixture according to claim 2, wherein said frame includes light shielding means for reducing unwanted dispersion of light.

4. The light fixture according to claim 1, wherein said plate includes means formed therein for defining a well, said well defining means including a plurality of light reflecting sidewalls and a light reflecting bottom wall.

5. The light fixture according to claim 4, wherein said well defining means includes a plurality of light reflecting walls, each one of said light reflecting walls having a trapezoidal configuration.

6. The light fixture according to claim 4, wherein said well defining means includes a light reflecting front wall.

7. The light fixture according to claim 4, wherein said well defining means includes a light reflecting rear wall.

8. The light fixture according to claim 5, wherein each one of said plurality of light reflecting sidewalls includes a flange and means for fastening said flange to said plate.

9. The light fixture according to claim 4, wherein said fixture includes a front wall and a light reflecting element disposed on said plate between said well and said front wall.

10. The light fixture according to claim 9, wherein said light reflecting element includes a light reflecting surface, said surface being inclined, with reference to said plate, at an angle of between 30° and 50°.

11. The light fixture according to claim 9, wherein said light reflecting element includes a light reflecting surface, said surface being inclined, with reference to said plate, at an angle of about 45°.

12. The light fixture according to claim 4, wherein said fixture includes a rear wall and a light reflecting element disposed on said plate between said well and said rear wall.

13. The light fixture according to claim 12, wherein said light reflecting element includes a light reflecting surface, said surface being inclined, with reference to said plate, at an angle of between 30° and 50°.

14. The light fixture according to claim 12, wherein said light reflecting element includes a light reflecting surface, said surface being inclined, with reference to said plate, at an angle of about 45°.

15. The light fixture according to claim 4, including a pair of light reflecting assemblies, each one of said light reflecting assemblies being disposed laterally of a line bisecting said base.

16. The light fixture according to claim 15, wherein each one of said light reflecting assemblies includes a plurality of light reflecting fins.

17. The light fixture according to claim 16, in which a first one of each of said plurality of light reflecting fins is trapezoidal in configuration.

18. The light fixture according to claim 17, in which said first one of each of said plurality of light reflecting fins is canted laterally away from the perpendicular with reference to said plate at an angle of between 65° and 75°.

19. The light fixture according to claim 17, wherein said first one of each of said plurality of light reflecting fins is elongated, having a long axis parallel to a plane bisecting said front light reflecting element and said rear light reflecting element.

20. The light fixture according to claim 17, wherein said first one of each of said plurality of light reflecting fins includes a flange, said flange being affixed to said plate.

21. The light fixture according to claim 16, in which a second one of each of said light reflecting fins is trapezoidal in configuration, having a truncated top.

22. The light fixture according to claim 21, in which said second one of each of said plurality of light reflecting fins is canted laterally from the perpendicular with reference to said plate at an angle of between 55° and 65°.

23. The light fixture according to claim 21, wherein said second one of each of said plurality of light reflecting fins is elongated, having a long axis forming an angle of about 30° to a plane bisecting said front light reflecting element and said rear light reflecting element.

24. The light fixture according to claim 21, wherein said second one of each of said plurality of light reflecting fins includes an edge, said edge extending laterally to said first one of each of said plurality of light reflecting fins.

25. The light fixture according to claim 21, wherein said second one of each of said plurality of light reflecting fins includes a flange, said flange being fixedly attached to said plate.

26. The light fixture according to claim 16, wherein said plurality of light reflecting fins includes a third fin.

27. The light fixture according to claim 26, wherein said third one of said plurality of light reflecting fins fin is generally rectangular in shape.

28. The light fixture according to claim 26, wherein said third one of said plurality of light reflecting fins is disposed at a 45° angle to a plane bisecting said front light reflecting element and rear light reflecting element.

29. The light fixture according to claim 25, wherein said third one of said plurality of light reflecting fins includes a flange, said flange being fixed to said plate.

30. The light fixture according to claim 25, wherein said third one of said plurality of light reflecting fins includes an edge, said edge extending laterally to said second one of said plurality of light reflecting fins.

31. The light fixture according to claim 1, wherein said fixture further includes an elongated light reflecting plate, said plate having edges, said edges extending laterally beyond each one of said third one of said plurality of light reflecting fins of said plurality of light reflecting assemblies.

32. The light fixture according to claim 31, wherein said light reflecting plate includes a flange, said flange being fixed to said plate.

33. The light fixture according to claim 31, wherein said light reflecting plate includes a first surface disposed at approximately 45° to the surface of said plate, being canted away therefrom.

34. The light fixture according to claim 17, including a front reflective element.

35. The light fixture according to claim 34, wherein said front reflective element includes a reflective surface disposed at about a 45° angle to said plate, said surface angling outwardly away from a line bisecting said base, said front reflective element further including a perpendicular wall.

36. The light fixture according to claim 35, wherein said perpendicular wall includes a flange, said flange being fixed to said plate.

37. The light fixture according to claim 1, wherein said fixture further includes switch means for interrupting and restoring electrical power to said light source.

38. The light fixture according to claim 1, including cover securing means.

39. The light fixture according to claim 1, including wire routing means for routing wire into said base.

40. The light fixture according to claim 1, including a pair of sidewalls, a front wall, a rear wall and a bottom wall wherein said bottom wall is configured for receipt therewithin of light ballast means.

41. The light fixture according to claim 40, wherein said pair of sidewalls, said front wall and said bottom wall define a space within said base, said base being suitable for disposition therewithin of the lamp ballast means.

42. The light fixture according to claim 41, wherein said pair of sidewalls, said front wall and said bottom wall define a space within said base, said space being suitable for disposition therewithin of lamp ballast.

*43. A light fixture for illuminating a surface, comprising:*

*a housing for supporting therein a light producing source;*

*a convex lens cover hinged to said housing for helping to disburse light on the surface in a generally uniform manner and for providing quick and easy access to said light producing source for bulb replacement purposes; and*

*a plate mounted within said housing, said plate having a plurality of light reflecting fins of projecting therefrom in a direction away from said plate for helping to direct light through said convex lens cover; and*

*a knuckle assembly mounted to said housing for providing water tight and weatherproof access to the interior of said housing to facilitate providing said light producing source with electrical power.*

*44. The light fixture according to claim 43, wherein said knuckle assembly includes a joint, said joint enabling adjustment of an angle at which the light fixture is oriented toward the surface for illuminating purposes.*

*45. A light fixture for illuminating a surface, comprising:*

*a housing for supporting therein a light fixture having a replaceable light bulb;*

*a housing cover having a convex lens mounted thereto for helping to distribute light in a generally uniform manner across the surface; and*

*a rectangular light reflector mounted within said housing, said light reflector having a plurality of light reflecting walls of different sizes and shapes; and*

*wherein at least some of said light reflecting walls overlap with one another for helping to direct light from said light bulb through said convex lens.*

*46. The light fixture according to claim 45, wherein said housing cover further includes:*

*a frame for supporting said convex lens in a desired orientation; and*

*a light shield for helping to prevent unwanted light scattering from said light bulb and said light reflector.*

*47. The light fixture according to claim 46, wherein said light shield and said convex lens are approximately equal in height to provide the light fixture with an aerodynamic characteristic for helping the fixture to withstand high winds without damage.*

*48. The light fixture according to claim 47, wherein said plurality of light reflecting walls includes a plurality of light reflecting fins canted laterally away from the perpendicular relative to the housing at an angle of between about 50 degrees and about 75 degrees.*

*49. A light fixture for illuminating a surface, comprising:*

*a housing for supporting therein a light fixture having a replaceable light bulb;*

*a convex lens mounted to said housing for helping to distribute light in a generally uniform manner across the surface;*

*a light reflector having an outer boundary edge;*

*a plurality of light reflecting surfaces disposed inwardly of said outer boundary edge and projecting therefrom and canted upwardly and laterally away from the perpendicular with reference to said housing for helping to direct light through said convex lens.*

*50. The light fixture according to claim 49, wherein said light reflecting surfaces includes a front light reflecting element and a rear light reflecting element.*

*51. The light fixture according to claim 50, wherein said plurality of light reflecting surfaces further includes a first plurality of light reflecting fins and a second plurality of light reflecting fins.*

*52. The light fixture according to claim 51 wherein said first plurality of light reflecting fins is elongated having a long axis parallel to a plane bisecting said front light reflecting element and said rear light reflecting element.*

*53. The light fixture according to claim 52, wherein said second plurality of light reflecting fins includes an edge, said edge extending laterally to said first plurality of light reflecting fins.*

*54. A light fixture for illuminating a surface, comprising:*

*a housing for supporting therein a light fixture having a replaceable light bulb;*

*a convex lens mounted to said housing for helping to distribute light in a generally uniform manner across the surface; and*

*a light reflector having a plurality of light reflecting surfaces projecting therefrom and canted laterally away from the perpendicular with reference to said housing for helping to direct light through said convex lens;*

*wherein said light reflecting surfaces includes a front light reflecting element and a rear light reflecting element;*

*wherein said plurality of light reflecting surfaces further includes a first plurality of light reflecting fins and a second plurality of light reflecting fins;*

*wherein said first plurality of light reflecting fins is elongated having a long axis parallel to a plane bisecting said front light reflecting element and said rear light reflecting element;*

*wherein said second plurality of light reflecting fins includes an edge, said edge extending laterally to said first plurality of light reflecting fins;*

*wherein said second plurality of light reflecting fins is elongated, having a long axis forming an angle of about 30 degrees to a plane bisecting said front light reflecting element and said rear light reflecting element.*

*55. The light fixture according to claim 54 wherein said plurality of light reflecting surfaces includes: a pair of sidewalls, a front wall, a rear wall, and a bottom wall that cooperate to help produce a uniform light over a large flat surface.*

*56. The light fixture according to claim 55 wherein said pair of sidewalls, said front wall and said bottom wall cooperate to help define a space within said housing:*

*wherein said space has a sufficient volume for receiving said ballast.*

*57. The light fixture according to claim 56, wherein said second plurality of light reflecting fins is canted laterally from the perpendicular with reference to the plate at an angle of between about 55 degrees and about 65 degrees.*

*58. In combination with a low profile light fixture having a convex lens for helping to distribute light uniformly over a surface, a light reflector, comprising:*

*a rectangular metallic sheet having a polished mirror-like finish with a plurality of light reflecting fins projecting therefrom for directing light to the convex lens;*

*wherein said plurality of light reflecting fins have different sizes and shapes and are canted laterally away from a perpendicular plane relative to the horizon at a plurality of different angles.*

*59. In combination with a low profile light fixture having a convex lens for helping to distribute light uniformly over a surface, a light reflector, comprising:*

*a metallic sheet having a polished mirror-like finish with a plurality of light reflecting fins projecting therefrom for directing light to the convex lens;*

*wherein said plurality of light reflecting fins is canted laterally away from a perpendicular plane relative to the horizon at a plurality of different angles; and*

*wherein said plurality of different angles include an angle C of between about 50 degrees and about 60 degrees, an angle E of between about 55 degrees and about 65 degrees and an angle F of between about 65 degrees and about 75 degrees.*

* * * * *